J. Toay,
Harvester Rake.

No. 105,608. Patented July 19, 1870.

Witnesses
R. Edw. J. Eils
Joseph R. Edson

James Toay
Inventor.
D. R. Holloway & Co.
Atty

UNITED STATES PATENT OFFICE.

JAMES TOAY, OF MINERAL POINT, WISCONSIN.

IMPROVEMENT IN HARVESTER-RAKES.

Specification forming part of Letters Patent No. 105,608, dated July 19, 1870.

*To all whom it may concern:*

Be it known that I, JAMES TOAY, of Mineral Point, in the county of Iowa and State of Wisconsin, have invented a certain Improvement in Harvester-Rakes; and I do hereby declare that the following is a full, clear, and exact description thereof, reference being had to the annexed drawing, making part of this specification, in which—

Figure 1:
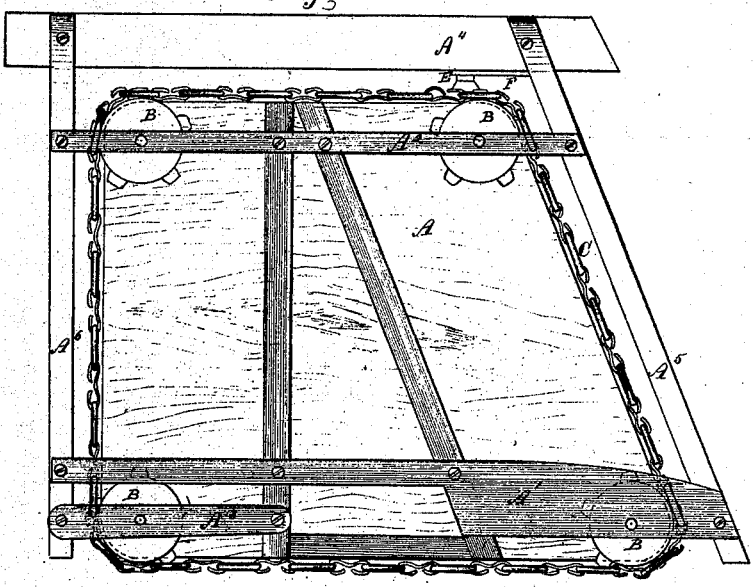
Figure 2:
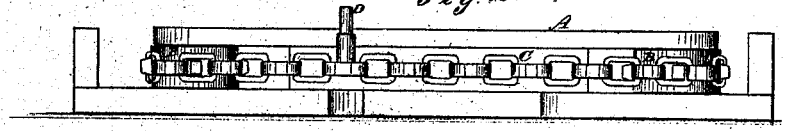
Figure 3:
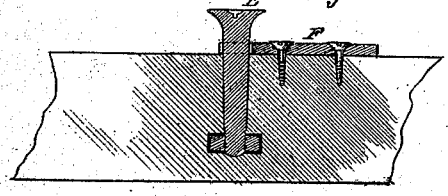

Figure 1 is a bottom view of a platform of a harvester, showing the mechanism which draws the rake, and also the knife for cutting the straw from the stud or pin to which the rake is attached and from which it derives its motion. Fig. 2 is an elevation of the rear portion of the platform, showing the sprocket-wheels, around which the endless chain passes, and also the stud or pin which moves the rake. Fig. 3 is a detached portion of the front cross-bar of the platform, showing also the knife for cutting the straw from the pin or stud which moves the rake, and the means for holding the same in position.

Corresponding letters refer to corresponding parts in the several figures.

In harvester-rakes which are driven by means of an endless chain in any manner, substantially as shown in the drawing, great difficulty has been experienced from the fact that straw is wound around the pin or stud which is attached to the endless chain, and which gives motion to the rake, or around a thimble which may be placed upon such pin or stud, thus clogging the machine and making it necessary to frequently stop its operation in order that such obstruction may be removed by the attendant.

The object of this invention is to provide a remedy for the above-recited difficulty; and to this end it consists in the construction of the knife or cutter F, and its combination with the chain which carries the rake, for cutting off any straw which may become wound around such stud or pin, and in its arrangement with reference to one of the sprocket-wheels around which the chain passes, as will be more fully explained hereinafter.

A in the drawing refers to the platform of a harvesting or reaping machine, it being supported upon beams $A^1$ $A^2$, &c., as shown in Fig. 1 of the drawing, or any in other suitable manner, the beams $A^1$, &c., being so arranged as to receive the journals of the sprocket-wheels and hold such wheels in their proper positions.

B B refer to sprocket-wheels, which are placed on the corners of the platform, they being provided with projections which enter the space in the open links of the endless chain, by which means it is compelled to traverse around the peripheries of said wheels, they being driven, in any convenient manner, from any part of the machine which has a rotary motion.

C refers to the endless chain, which is composed of alternate solid and open links, the open ones being so constructed as to embrace the projections upon the sprocket-wheels.

D refers to a pin or stud, which is firmly secured to one of the solid links of the chain, it projecting upward therefrom a distance sufficient to enable it to be connected to the rake, so that it may give motion thereto, or such rake may impart motion to the chain and its stud or pin, if desired.

Between the upper edge of the chain and the point where the rake is attached to the pin it is provided with a thimble, which revolves freely thereon, in order that when it comes opposite the knife the straw may be cut from it, it ceasing to rotate while the cutting is being done.

The above-described parts are of well-known construction, and need not be more particularly described here, as they form no part of this invention.

That portion of the apparatus shown, which constitutes the improvement herein claimed, consists of a knife or cutter, which is arranged near one of the sprocket-wheels, for the purpose of cutting the straw from the stud or pin as it passes that point. This knife or cutter is shown at E, and consists of an instrument, in this case, having four cutting-edges, such instrument being secured to the beam $A^4$ of the frame, and made adjustable therein, so that it may be set at a proper distance from the collar upon the stud or pin, and thus enable it to cut any straw therefrom which may become wound around it during its passage around the platform. The construction of this knife or cutter is such that it has four cutting-edges, which form is found to be best, as it prevents the necessity of frequently removing it for sharpening, as when one of the edges becomes dulled it may be turned one-fourth of a revolution, and thus a sharp edge will be brought opposite the pin or stud, and so on until all of the edges have been used. The nut upon the inner end of this knife affords the means of adjusting it with reference to the pin or stud, so that as it passes the knife it shall cut the straw from it.

F refers to a piece of metal which is attached to the frame of the machine by screws or bolts, its end being bifurcated, so as to embrace three sides of the knife, and thus prevent its being turned in the beam which holds it.

I am aware that cutters or knives have been used in connection with harvester-rakes for the purpose of cutting the straw from the stud or pin which connects such rake with the stud or pin which moves them, said stud or pin being held in its position with reference to the cutter by means of springs. I do not therefore claim, broadly, a knife or cutter for such purpose; neither do I claim, broadly, the combination of a knife with the chain of a harvester-rake; but,

Having thus described my invention, what I claim, and desire to secure by Letters Patent, is—

1. The knife E, constructed with two or more cutting-edges, in combination with the chain of a harvester-rake, and arranged so that as one becomes dulled by use the other or others may be brought into requisition without delaying the operation of the machine to any considerable extent.

2. The arrangement of the knife E with reference to the sprocket-wheel B, it being such that the pin D is held in its proper position with reference to such knife by said sprocket-wheel, so that, as said pin or stud passes this point, it shall be held in such close proximity to the knife that all the straw shall be cut off from it.

In testimony whereof I have signed my name to this specification in the presence of two subscribing witnesses.

JAMES TOAY.

Witnesses:
    CYRUS LANYON,
    THOMAS T. PARMELE.